United States Patent [19]

Bailey

[11] 4,441,848

[45] Apr. 10, 1984

[54] SELF-LOADING MATERIAL TRANSPORTER

[76] Inventor: Gerald M. Bailey, P.O. Box 36373, Tucson, Ariz. 85740

[21] Appl. No.: 299,309

[22] Filed: Sep. 4, 1981

[51] Int. Cl.$^3$ ............................................. B60P 1/38
[52] U.S. Cl. .................................. 414/439; 414/491; 414/528
[58] Field of Search ............... 414/434, 437, 439, 491, 414/528; 56/DIG. 15

[56] References Cited

U.S. PATENT DOCUMENTS

| | | | |
|---|---|---|---|
| 3,841,647 | 12/1969 | Cook | 414/528 X |
| 4,229,931 | 10/1980 | Schlueter | 56/DIG. 15 X |
| 4,243,353 | 1/1981 | Reed | 414/539 |

Primary Examiner—Robert G. Sheridan

[57] ABSTRACT

A self-loading material transporter utilizes a conveyor system having a continuous, flexible conveyor belt. A plurality of rollers is positioned below the upper surface of the conveyor system to support the load bearing portion of the conveyor belt as it passes over the upper surface of the conveyor system. The conveyor belt can be rotated in either a forward or reverse direction to either load or unload the material transporter. The conveyor system may be mounted on a truck, trailer, or other vehicle. The conveyor system may be tilted into an inclined position to load or unload material from the ground or it can be operated in a horizontal position to load or unload material from an elevated loading dock.

12 Claims, 12 Drawing Figures

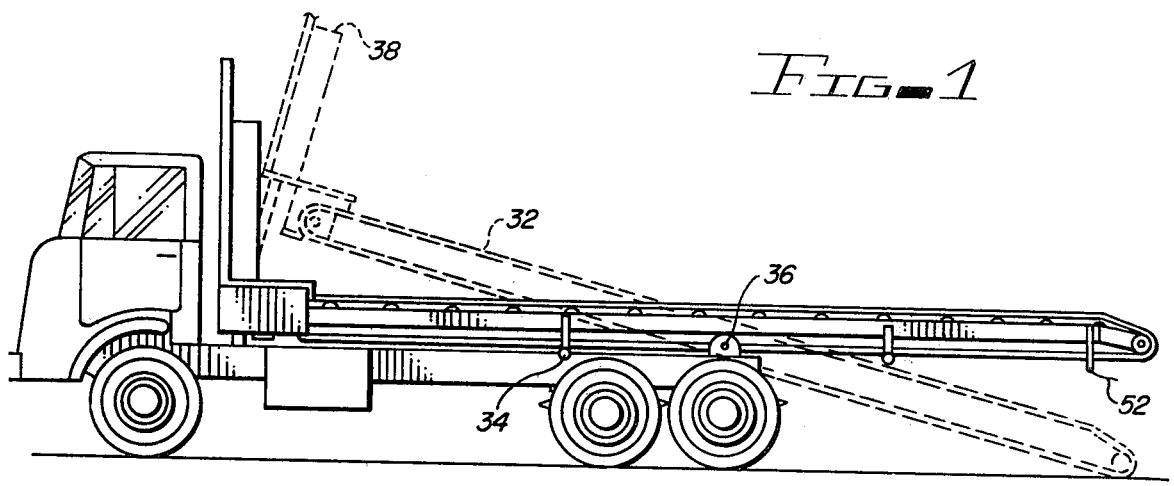
FIG-1
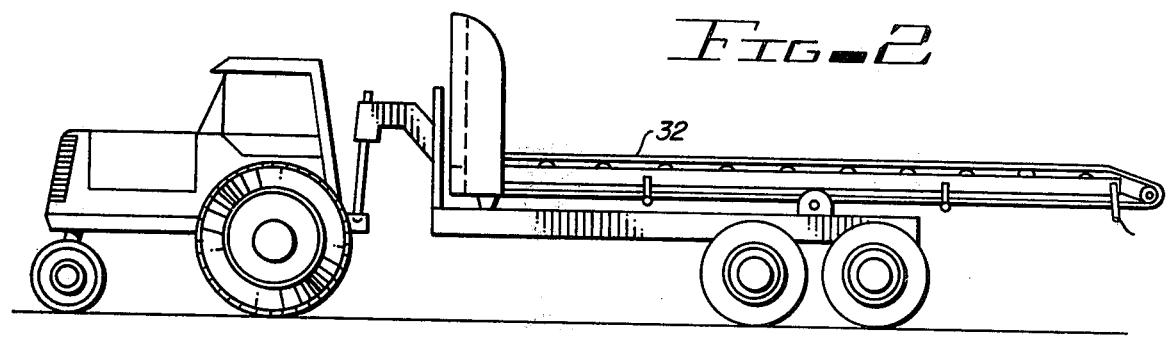
FIG-2
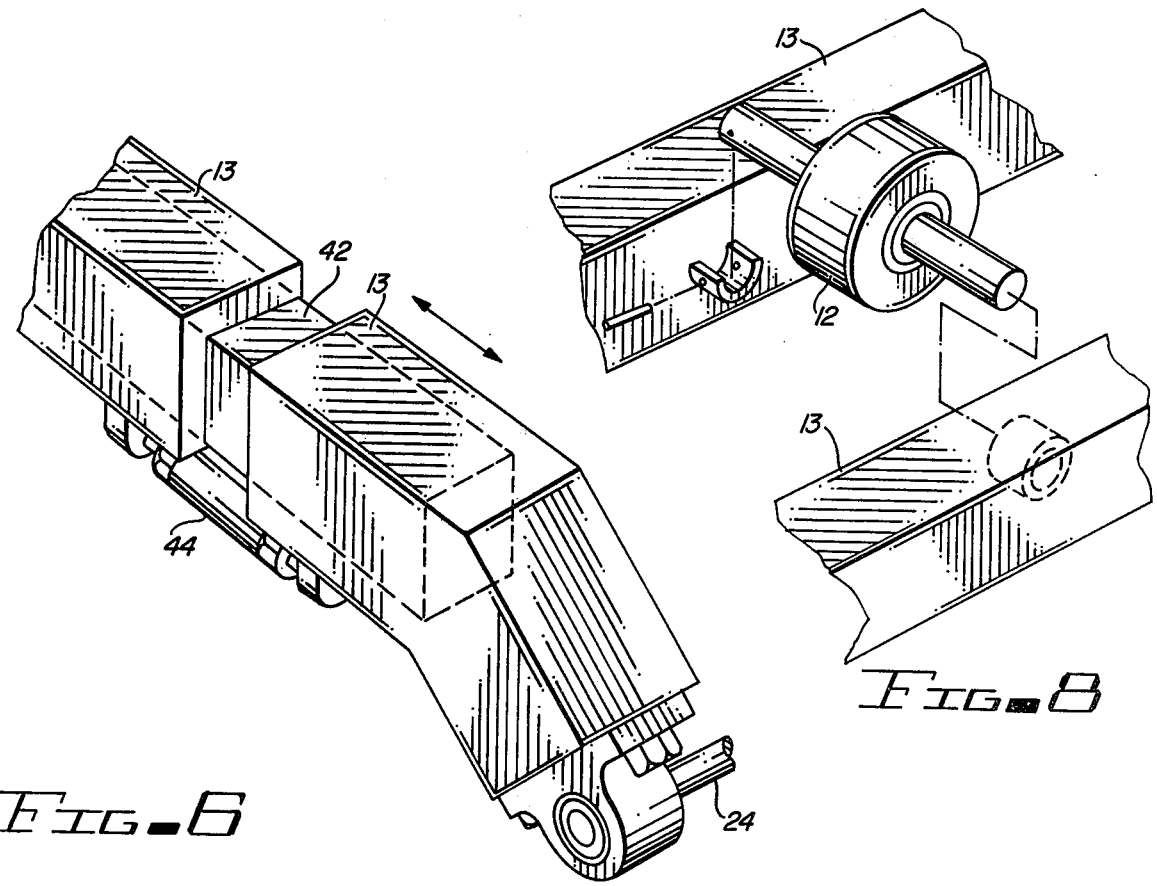
FIG-6
FIG-8

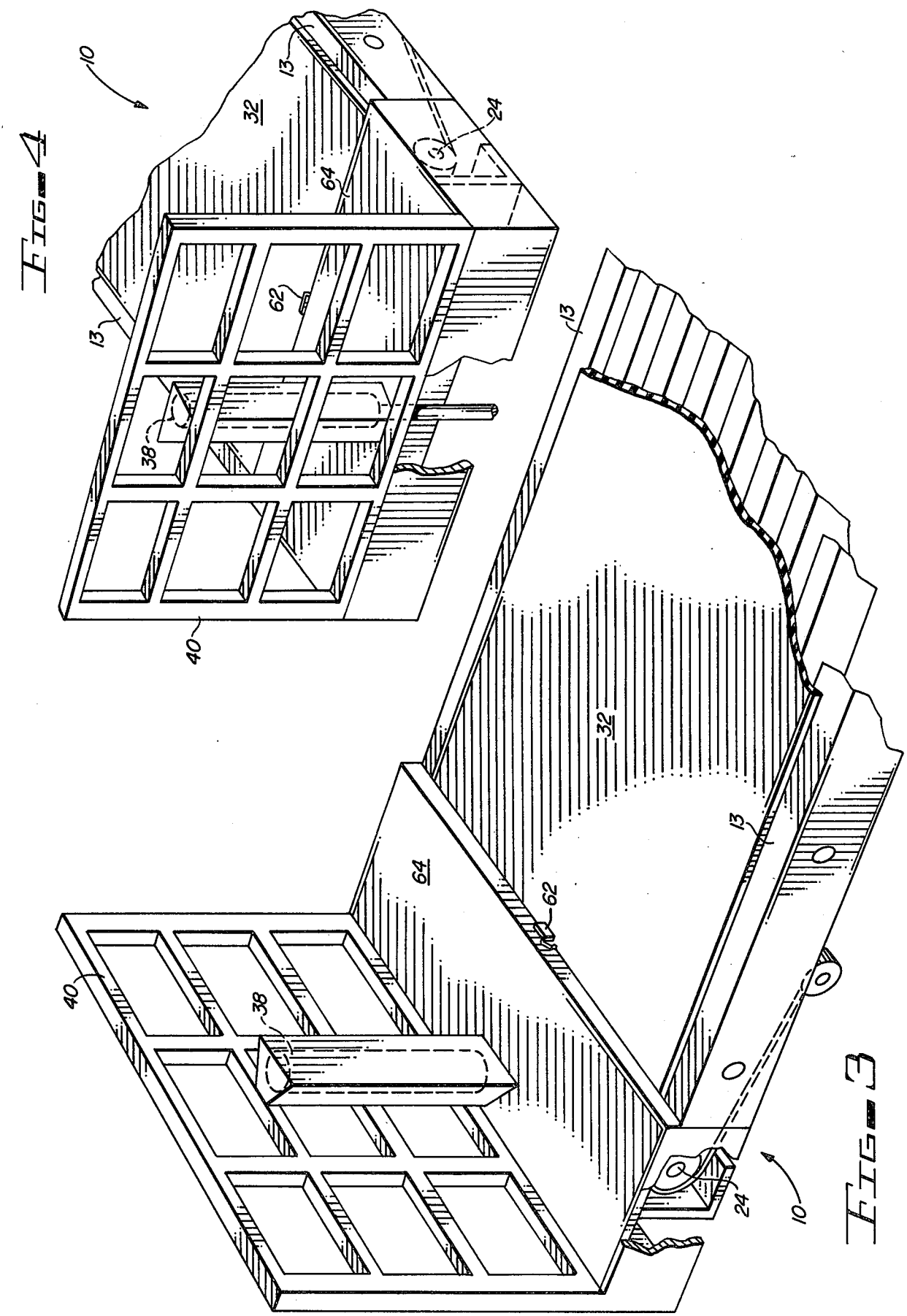

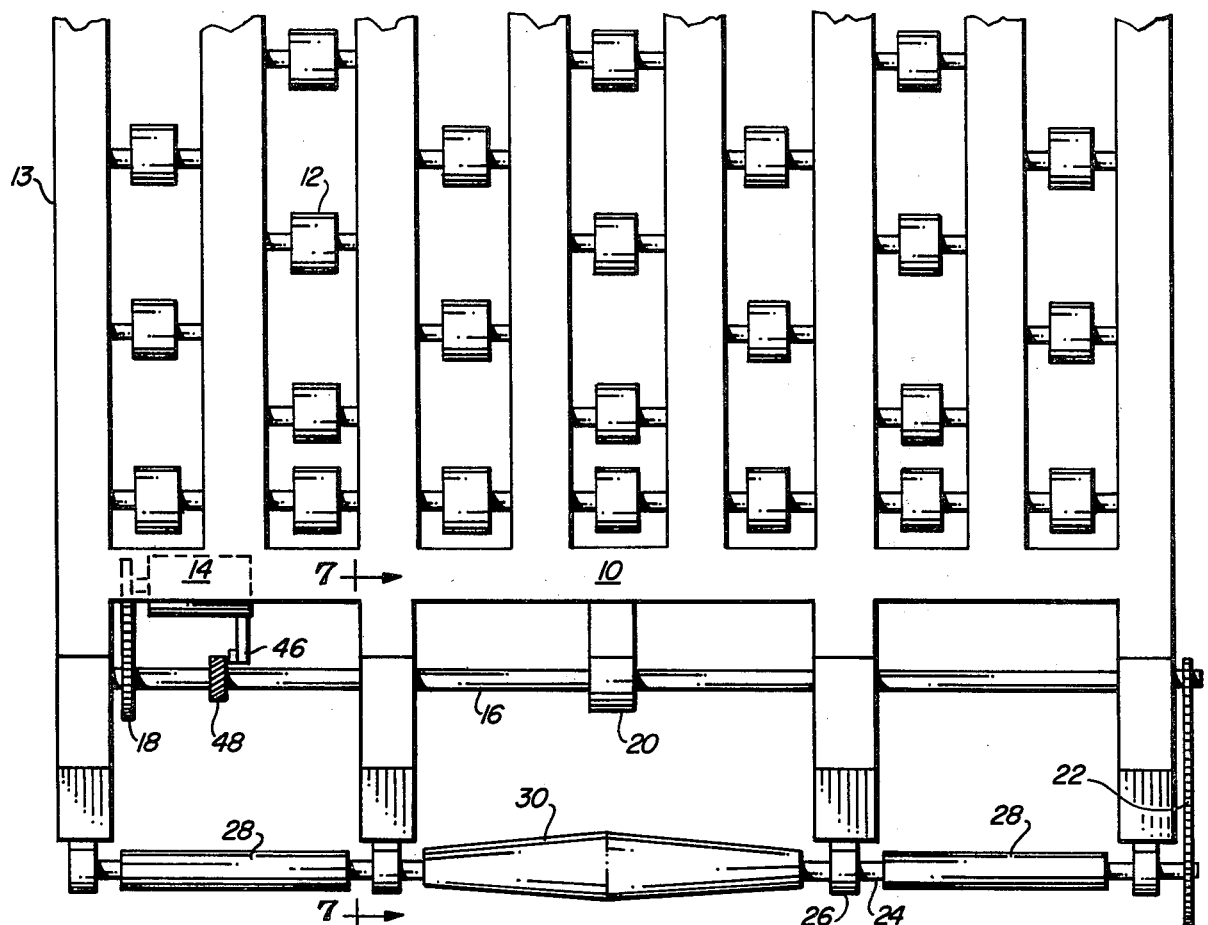
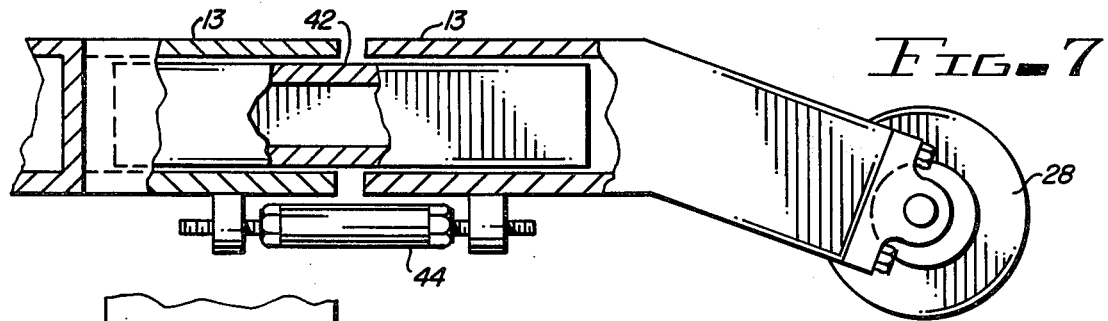
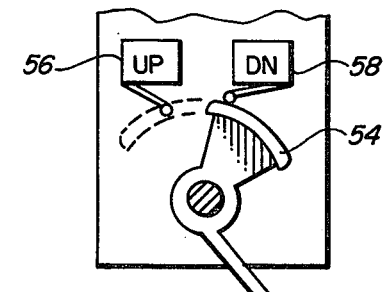
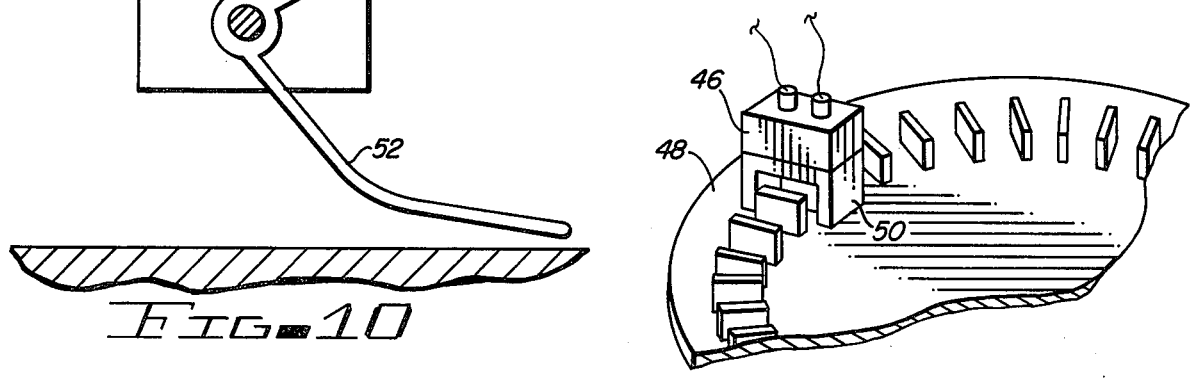

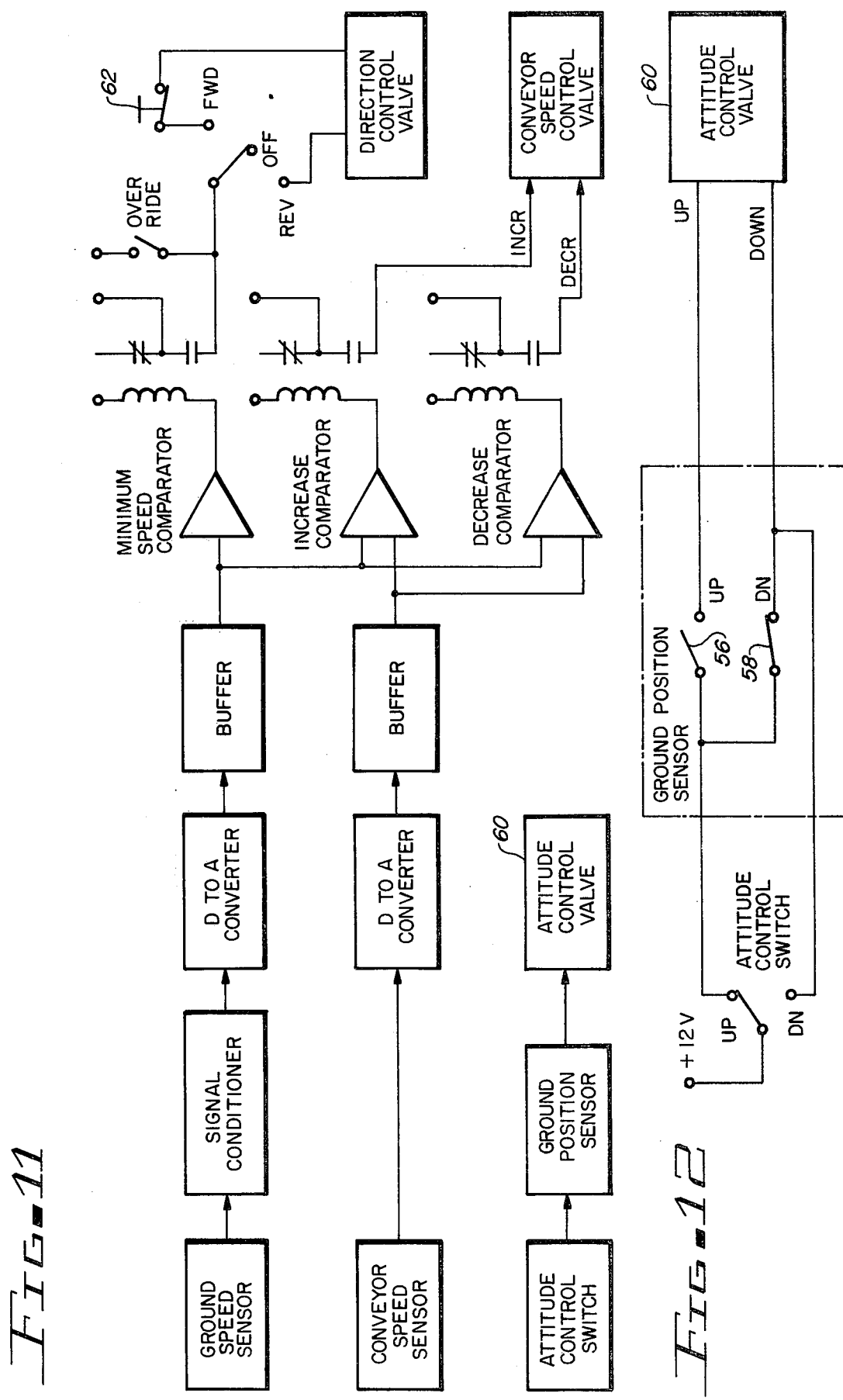

SELF-LOADING MATERIAL TRANSPORTER

BACKGROUND OF THE INVENTION

1. Field of the Invention

This invention relates to self-loading material transporters, and more particularly, to self-loading material transporters having a tiltable conveyor system.

2. Description of the Prior Art

Numerous conveyor systems mounted on either a truck or a trailer and including a tiltable bed for loading and unloading materials are disclosed in various prior art references. U.S. Pat. No. 3,298,550 (Schiltz) discloses a haystack transporting device having a multiple chain conveyor system mounted on a tiltable bed. The multiple chain conveyor system is formed from six separate continuous conveyor chains. The ends of each conveyor chain are supported by sprocket wheels. A pair of drive chains are coupled at one end to a power take-off system which rotates at a velocity determined by engine RPM. The opposite end of each drive chain is coupled to independently rotatable drive axles each of which rotates a group of three conveyor chains. Each conveyor chain is provided with a plurality of outwardly extending, longitudinally spaced hook-like teeth which serve to engage the lower surface of the material being loaded or unloaded from the Schiltz conveyor system. Ten freely rotatable wheels are coupled to the lower, rear surface of the tiltable conveyor bed and serve to support the rear end of the conveyor bed when the conveyor bed is in the inclined loading/unloading configuration.

U.S. Pat. No. 4,096,960 (Gilmore) discloses a remotely controllable, trailer-mounted multiple chain conveyor system having a tiltable bed. U.S. Pat. No. 4,081,094 and Re. 30,404 (Pereira) discloses a conveyor trailer for transporting agricultural commodities. This device includes a multiple chain conveyor similar to the conveyor system disclosed in the Schiltz patent. The Pereira conveyor system also includes a plurality of flotation wheels mounted on the lower rear surface of the tiltable bed for maintaining a predetermined fixed spacing between the ground and the lower surface of the conveyor bed. A roller which is coupled to the lower surface of the tiltable bed engages a non-driven trailer wheel and rotates at a speed proportional to the trailer velocity. This trailer velocity input signal is utilized to synchronize the velocity of the multiple chain conveyor with the trailer velocity. The velocity measuring roller operates only when the tiltable conveyor bed has been fully displaced into the inclined loading position and must be maintained in firm, non-slipping contact with the trailer wheel in order to maintain proper synchronization of the multiple chain conveyor with the velocity of the supporting trailer.

U.S. Pat. No. 4,243,353 (Reed) discloses a multiple chain conveyor similar in contruction to that disclosed in the Schiltz patent. The conveyor disclosed by Reed also includes a separate speed metering wheel coupled to the lower rear surface of the tiltable conveyor bed. This speed metering wheel engages the ground only when the tiltable bed is fully inclined into the loading position and provided a proper ground speed indication only when the speed metering wheel is maintained in firm, non-slipping contact with the ground. A plurality of cleated drive wheels also extend from the lower surface of the tiltable conveyor bed and assist in propelling the conveyor system with respect to the ground.

U.S. Pat. No. 4,101,081 (Ritter) discloses a truck-mounted conveyor system having a tail section which can be dropped to the ground. Two parallel chain conveyor elements each include a plurality of load engaging tines and permit hay or similar materials to be loaded into the truck bed. The conveyor system is operated while the truck is maintained in a stationary position. The rear end of the conveyor system contacts the ground when the conveyor system is operated.

U.S. Pat. No. 3,317,066 (Hamm) discloses a trailer having vertical sidewalls and a non-tiltable conveyor belt which is located in the floor of the trailer bed. The Hamm conveyor system is intended to assist in loading or unloading materials from the trailer bed. As materials are loaded onto the trailer bed, a plurality of rectangular hinged panels are sequentially dropped into position. Each panel is closed over the upper surface of the conveyor belt as the trailer bed in front of that panel is loaded.

U.S. Pat. No. 3,927,780 (Dearlove) discloses a garbage collection vehicle which includes an inclined, non-tiltable conveyor system extending from the front portion of the vehicle. This conveyor system engages a trash bag, elevates the trash bag, and ejects it into an internally mounted garbage bin. The Dearlove conveyor system is operated when the vehicle is stopped.

U.S. Pat. No. 3,550,866 (Swenson) discloses a truck-mounted material spreader which utilizes a tine conveyor to discharge material from the truck bed at a rate proportional to the vehicle speed. A photoelectric sensor is utilized to measure vehicle speed. U.S. Pat. No. 3,929,292 discloses a material spreader which varies the rate of discharge of material from the spreader hopper at a rate proportional to the rate of movement of the vehicle.

U.S. Pat. No. 3,917,092 (McGinnis) discloses a non-tiltable, flexible belt conveyor system which is coupled to a vehicle and serves to load, transport and unload material from the vehicle. The sides of the flexible conveyor belts are provided with a plurality of sprocket apertures.

U.S. Pat. Nos. 4,136,508 (Coleman), 4,229,931 (Schlueter), 4,227,363 (Kerber) and 3,728,851 (Van Antwerp) disclose a variety of ground engagement sensing devices each of which is coupled to the front portion of a powered agricultural vehicle to control the spacing between that portion of the vehicle and the ground.

The following U.S. Patents disclose a variety of vehicle-mounted conveyor systems having either tiltable or non-tiltable beds for loading or unloading material: Nos. 3,209,932 (Schiltz); 2,156,438 (Suverkrup); 2,526,960 (McElhinney et al.); 2,951,578 (Hibbard); 1,106,171 (Wangsness); 2,761,577 (Lahman); 2,418,726 (Rogers, Jr.); 1,258,351 (Martin); 1,628,871 (Bruce); 2,466,452 (Lisota); 3,025,982 (Quint); and 2,408,862 (Lisota).

As is readily apparant from a review of the Schiltz patents and related patents which disclose multiple chain conveyor systems, prior art systems of this type are mechanically highly complex in that a large number of chains which are fabricated from hundreds or thousands of separate mechanical elements are utilized. In addition, each chain is driven and supported by a pair of sprockets having large numbers of sprocket teeth which engage and rotate the conveyor chains. If a multiple chain conveyor system is not stopped after the material being loaded contacts the front end of the conveyor system, the load engaging teeth will continue to move and will rip tunnels in the non-moving bottom surface of the material. To reduce mechanical friction and wear of the various moving elements of the conveyor chains, the chains must be maintained in a well-lubricated state. This lubricant will be transferred from the chains to the lower surface of the material as it is loaded, transported or unloaded by the multiple chain conveyor systems discussed above. With certain materials such as cotton, this chain lubricant may stain the lower surface of the cotton unless appropriate precautions are taken.

SUMMARY OF THE INVENTION

It is therefore a primary object of the present invention to provide a self-loading material transporter which utilizes a continuous, flexible conveyor belt to load or unload material.

Another object of the present invention is to provide a self-loading material transporter which automatically maintains a fixed clearance between the rear end of the tiltable conveyor system and the ground.

Yet another object of the present invention is to provide a self-loading material transporter having a conveyor system which automatically stops when the material being loaded reaches a predetermined point along the conveyor bed.

Still another object of the present invention is to provide a self-loading material transporter which is comparatively safe to operate and which contacts the surface of the material being loaded with only a single, non-lubricated surface.

Briefly stated, and in accord with one embodiment of the invention, a self-loading material transporter includes a conveyor system having a linear upper surface and lower surface, first and second ends and a continuous, flexible conveyor belt extending around the upper and lower surfaces and the second end of the system. The conveyor system also includes support means which is positioned below the section of the conveyor belt which passes along the upper surface of the conveyor system to provide a low friction support for the conveyor belt. A drive system is coupled to the conveyor belt and serves to translate the conveyor belt in either a first or a second direction with respect to the upper surface of the conveyor system. The conveyor system is mounted on a vehicle such as a truck or a trailer. The conveyor system is pivotally coupled to the truck or trailer and includes means for tilting the conveyor system between a horizontal position and an inclined loading/unloading position.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 1 is an elevational view of a self-loading material transporter of the present invention, particularly illustrating the manner in which the bed can be inclined into a loading/unloading position.

FIG. 2 is an elevational view depicting a second preferred embodiment of the present invention in which the self-loading material transporter is coupled to a trailer.

FIG. 3 is a partially cutaway perspective view of the front portion of the self-loading material transporter of the present invention.

FIG. 4 is a partially cutaway perspective view particularly illustrating the front portion of the self-loading material transporter of the present invention.

FIG. 5 is a partially cutaway plan view of the front section of the conveyor system of the present invention in which the conveyor belt has been removed to depict the inner mechanical structure of the system.

FIG. 6 is a partially cutaway perspective view illustrating the mechanism which adjusts the length of the rear section of the conveyor system support structure to adjust the conveyor belt.

FIG. 7 is a partially cutaway elevational view of the tension adjustment mechanism illustrated in FIG. 6.

FIG. 8 illustrates a conveyor belt support pulley and its relative position to the tubular support beams of the conveyor system.

FIG. 9 illustrates the magnetic velocity sensing means which is used to sense transporter velocity and conveyor belt velocity.

FIG. 10 is an elevational view of the tail skid height sensing mechanism of the present invention.

FIG. 11 is a block diagram representation of the electronic/hydraulic systems which control various aspects of the operation of the self-loading material transporter.

FIG. 12 is a schematic diagram which represents the manner in which the tail skid ground position sensing mechanism operates to control the attitude of the tiltable conveyor system of the present invention.

DESCRIPTION OF THE PREFERRED EMBODIMENT

In order to better illustrate the advantages of the invention and its contributions to the art, a preferred hardware embodiment of the invention will now be described in some detail.

Referring to FIGS. 1, 3, 4, and 5, the basic structural elements of the conveyor system of the present invention will now be described. An eight foot wide by thirty-seven foot long conveyor support structure is indicated generally by reference number 10. This conveyor support structure is fabricated from a plurality of four inch wide by ten inch high three sixteenth inch thick steel tubes which are designated by reference number 13. Seven lateral reinforcing supports (not shown) are fabricated from four and one half inch standard black pipe which extend horizontally through apertures formed in the side of the steel support tubes. FIGS. 5 and 8 illustrate the manner in which a plurality of four inch diameter ball bearing supported rollers 12 are positioned between adjacent steel tubes 13 of conveyor support structure 10. FIG. 8 illustrates one method of coupling rollers 12 to adjacent support tubes 13. Numerous different roller mounting configurations are suitable and would be readily apparent to one of ordinary skill in the art. The shaft of each roller 12 is coupled to support tubes 13 such that the upper surface of each roller extends slightly above the upper surface of adjacent support tubes 13.

A hydraulically powered conveyor motor 14 is mounted as illustrated in FIG. 5 between the upper and lower surfaces of conveyor support structure 10. In the preferred embodiment of the invention a Cher-lynn 10,000 series hydraulic motor is used. This motor is commercially available from the Eaton Manufacturing Co. and is designated as Model No. 119-1028. The drive shaft of motor 14 is coupled to an intermediate conveyor drive shaft 16 by drive chain 18. Drive shaft 16 is rotatably coupled to conveyor support structure 10 by four pillow block bearings of the type designated by reference number 20.

A pair of sprockets and a drive chain 22 couple drive shaft 16 to a first axle or drive shaft 24. The pair of sprockets which couple hydraulic motor 14 to shaft 16 and the pair of sprockets which couple shaft 16 to shaft 24 are dimensioned to provide a significant gear reduction between motor 14 and drive shaft 24 so that drive shaft 24 rotates at a significantly lower RPM than the drive shaft of motor 14.

Four pillow block bearings of the type designated by reference number 26 rotatably couple drive shaft 24 to conveyor support structure 10. Ten and one half inch diameter by twenty inch wide rubber covered steel drive pulleys 28 are coupled to the outboard sections of drive shaft 24. A ten and one half inch diameter by thirty eight inch wide rubber coated bevelled drive pulley 30 is coupled to the center section of drive shaft 24 and serves to maintain the conveyor belt of the present invention centered with respect to conveyor support structure 10.

Although the drive shaft and drive pulley assembly for the rear end of the conveyor system of the present invention has not been specifically illustrated in detail, that structure is very similar to the structural arrangement illustrated in FIG. 5. The freely rotatable, non-driven second axle or drive shaft 24 which is coupled to the rear end of the conveyor system of the present invention includes five and one half inch diameter by twenty inch wide outboard rubber coated drive pulleys 28 and a five and one half diameter by thirty eight inch wide bevelled rubber coated steel inboard pulley 30. Identical reference numbers have been used to designate both the front and rear drive shaft and front and rear drive pulleys although these elements have somewhat different characteristics as has been explained above.

A continuous, flexible conveyor belt 32 comprises the primary moving element of the present invention. In the preferred embodiment of the present invention, conveyor belt 32 has the following specifications: B. F. Goodrich type "V" roughtop, three ply Pm-60 belt, 180 P.I.W. This particular conveyor belt has the required strength, flexibility and surface frictional characteristics which permit the self-loading material transporter to load, unload and transport extremely heavy items such as thirty foot long by eight foot wide modules of compressed cotton which can weigh as much as 30,000 pounds. For loading materials having low coefficient of friction bottom surfaces, it may be desirable to utilize a conveyor belt which incorporates upwardly projecting metal cleats. Other different commercially available conveyor belts with different strength, flexibility and frictional characteristics may be suitable for loading various different types of material. The method of selecting the desired conveyor belt characteristics is readily apparant to one of ordinary skill in the art.

Three eighty-eight inch wide return roller assemblies designated by reference number 34 are coupled to the exposed sides of conveyor support structure 10. These two return roller assemblies engage the lower, non-loadbearing sections of conveyor belt 32 and limit the droop of the conveyor belt. These return roller assemblies are commercially available from the Jeffrey/Dresher Co. and are designated as Model 3-E-62.

A pivot pin assembly designated generally by reference number 36 provides a pivotal coupling between the exposed side surfaces of conveyor support structure 10 and the bed of a truck or trailer to which the pivotally mounted conveyor system of the present invention is coupled. A four inch diameter by sixty inch long hydraulic cylinder 38 includes a cylinder body which is coupled to a vertically extending front bracket 40 of conveyor support structure 10. The end of the shaft of hydraulic cylinder 38 is pivotally coupled to a fixed point on the bed of the truck or trailer assembly to which the tiltable conveyor assembly is coupled. In the preferred embodiment of the invention, the conveyor system is maintained in a horizontal position when the shaft of hydraulic cylinder 38 is retracted. When the shaft of hydraulic cylinder 38 is fully extended, the conveyor system is inclined approximately thirteen degrees.

In the preferred embodiment of the present invention, the tiltable conveyor system is coupled to a C-500 Kenworth tandem diesel motor truck having a RT-11509 transmission with a double low feature and a model 1241-C airshift auxiliary transmission with a 5.29×1 rear end ratio. This truck also includes a 12 CFM air compressor and a power take-off shaft which can either be mounted to the transmission or engine flywheel. Various other types of trucks can be used as an element of the present invention but the truck selected must have the requisite load bearing capability, power take-off feature, compressed air supply and gear ratio which will permit the truck to be driven at a precisely controllable velocity as low as 0.9 miles per hour. The truck air compressor not only supplies compressed air for the truck air brakes, but also supplies compressed air for electrically controlled, pneumatically actuated hydraulic control valves. A high pressure hydraulic pump such as a model 1-3520V30A21 ICC Vickers dual hydraulic pump is coupled to the engine power take-off shaft and provides a source of pressurized hydraulic fluid which powers hydraulic motor 14 and hydraulic cylinder 38.

If the self-loading material transporter of the present invention is fabricated in a trailer version of the type illustrated in FIG. 2, a source of compressed air and high pressure hydraulic fluid may be supplied by the vehicle which is coupled to the trailer. Alternatively, an air compressor and high pressure hydraulic system can be incorporated into the trailer version of the present invention and driven by a power take-off shaft from the vehicle coupled to the trailer. In another alternative embodiment of the trailer configuration of the present invention, an air compressor and hydraulic power source can be electrically powered from the towing vehicle electrical system or from another source of electrical power. It is also readily apparant that the tilting mechanism and conveyor drive mechanism of both the truck and trailer mounted embodiments of the present invention may be driven by electrically powered devices or various other well known power sources.

Referring now to FIGS. 6 and 7, a turnbuckle actuated, telescopic adjustment system is coupled to the rear end of conveyor support structure 10 to adjust the length of the conveyor support and thereby modify the tension on conveyor belt 32. As is illustrated, the rear section of support tubes 11 have been separated and coupled together by a smaller rectangular tube 42.

Referring now to FIG. 9, velocity measurement means which includes a fixed position magnetic sensor 46 and a finned rotary disk 48 will be described. Magnetic sensor 46 and rotary disk 48 are commercially available devices which are used in electronic speedometer systems or vehicle anti-skid systems. In order to determine the rate of translation or velocity of the conveyor system with respect to the ground, rotary disk 48 is mounted to a wheel hub of a non-driven wheel of the present invention. In the truck-mounted embodiment of the present invention, rotary disk 48 is coupled to a front wheel hub, while in the trailer-mounted version of the present invention, rotary disk 48 is coupled to a wheel hub of one of the trailer wheels. Magnetic sensor 46 is mounted to a non-rotating wheel element such as a portion of the brake assembly and is positioned around the outer edge of rotary disk 48 such that the permanent magnetic assembly 50 overlaps the finned outer edge of rotary disk 48. Rotation of the fins of rotary disk 48 with respect to a permanent magnet assembly 50 of magnetic sensor 46 generates an alternating output voltage which is processed by electronic elements of the system which will be described below to ascertain the velocity of the conveyor system with respect to the ground.

FIG. 5 illustrates that a second magnetic velocity sensor is utilized to determine the velocity or rate of movement of conveyor belt 32. A rotary disk 48 is coupled to drive shaft 16. Magnetic sensor 46 is coupled to a stationary portion of conveyor support structure 10 such that the permanent magnetic assembly 50 is placed adjacent to the rotating fins of disk 48. The electrical output signal produced by magnetic sensor 46 is coupled to electronic components of the present invention which generates an output signal representative of the conveyor belt velocity.

The magnetic sensor system coupled to a non-driven wheel of the present invention serves as a first velocity measurement means or ground speed sensor while the magnetic sensor assembly coupled to the conveyor belt drive system serves as a second velocity measurement means or conveyor speed sensor.

Referring now to FIG. 12, the synchronization means of the present invention will now be described in detail. The synchronization means receives the electrical output signals produced by the first and second velocity measurement means. The ground speed sensor output signal passes through a signal conditioner, digital to analog converter and a buffer which converts the variable frequency alternating current signal into an analog voltage which is coupled to a minimum speed comparator and to one input of an increase comparator and one input of a decrease comparator. The output of the minimum speed comparator is coupled to a relay. When the minimum speed comparator detects an input signal having a magnitude which indicates that the material transporter of the present invention is being moved at a speed more than a minimum threshold speed, the minimum speed comparator generates an input signal which closes the normally open contacts of the relay. If the cab-mounted conveyor direction control switch has been actuated into either the "forward" or "reverse" positions, a conveyor direction control command will be transmitted to the conveyor direction control valve which is an electrically operated, pneumatically actuated hydraulic valve which controls the direction of operation of hydraulic motor 14. If the cab-mounted conveyor direction switch is positioned in the central or "off" position, the conveyor belt will be maintained in a stationary position. If the vehicle is parked and the driver actuates the conveyor direction switch in either the "forward" or "reverse" positions, the minimum speed comparator will not generate an output signal and the conveyor belt cannot be moved.

An override feature of the self-loading material transporter may be used to unload material onto a loading dock when the transporter is parked. The override switch disables the minimum speed comparator interlock feature. To actuate the conveyor belt when the the transporter is parked, the operator actuates the override switch and selects either the "forward" or "reverse" position on the conveyor direction switch. In the override mode, the conveyor belt operates at a preprogrammed fixed velocity to either unload or load material from the loading dock. If the loading dock includes a fixed velocity conveyor system, the electronic circuitry of the present invention can readily be modified to permit the operator to adjust the velocity of the transporter conveyor system to precisely correspond to the loading dock conveyor system velocity so that the material being loaded or unloaded will not be damaged by a velocity differential between the transporter conveyor and the loading dock conveyor.

When the self-loading material transporter is utilized to load or unload large, extremely heavy items such as 20,000-30,000 pound cotton modules, it is essential that the speed of the conveyor belt be precisely synchronized with the transporter ground speed so that the portion of the thirty foot long cotton module still in contact with the ground is not pulled apart. This synchronization is accomplished by comparing the analog output signal which corresponds to the vehicle ground speed with the analog output signal which corresponds to conveyor speed. If the synchronization means detects a velocity signal which indicates that the ground speed exceeds the conveyor speed, the increase comparator is actuated and closes the normally open contacts on a control relay which transmits a speed increase signal to an electrically actuated pneumatically operated conveyor speed control valve. If the velocity error signal indicates that the conveyor speed exceeds the transporter ground speed, the decrease comparator is actuated and closes the normally open contacts of a second control relay which actuates the conveyor speed control valve to decrease the operating velocity of the conveyor belt.

The manner of implementing the electronic circuitry described above is well known to one of ordinary skill in the art. While the specific embodiment described above utilizes analog circuitry, purely digital circuitry could be coupled to the electrical output signals from the ground speed sensor and from the conveyor speed sensor to provide appropriate control signals for the conveyor direction control valve and for the conveyor speed control valve.

The self-loading material transporter also includes attitude control means which maintains a fixed distance between the rear end of the tiltable conveyor system and the ground. Referring now to FIGS. 10, 11 and 12, the attitude control means includes a cab-mounted attitude control switch which includes "off", "up" and "down" positions. The "down" position of the attitude control switch causes the conveyor system to retract to a horizontal position. The "up" position of the attitude control switch causes the conveyor system to be tilted from a horizontal or first position to an inclined or second position.

FIGS. 1 and 10 illustrate that a tail skid 52 is pivotally coupled to a bracket located near the end of the tiltable conveyor system. A pair of vertically extending bracket sections are coupled to the exposed sides of conveyor support structure 10. A horizontal bracket section is coupled to the lower extremities of the two vertical bracket sections and extends horizontally below the lower surface of conveyor belt 32. One end of tail skid 52 is pivotally coupled to this horizontal bracket section. A smoothly curved upper section 54 of tail skid 52 engages the contacts of an "up" microswitch 56 and a "down" microswitch 58. When the rear end of the conveyor system is at the correct spacing above the terrain, upper section 54 of tail skid 52 will be vertically oriented causing the switch contacts of switches 56 and 58 to be actuated into the compressed or closed position. FIG. 10 illustrates that tail skid 52 has rotated in a clockwise direction which indicates that the rear end of the conveyor system is excessively close to the ground and that the conveyor system must be tilted downward toward the retracted position to cause the contact on switch 56 to be actuated into the "closed" position. Since the cab-mounted attitude control switch is in the "up" position to maintain the conveyor system in the "up" position, the twelve volt signal will pass through the closed contacts of down microswitch 58 and will be transmitted to the "down" input of attitude control valve 60. Attitude control valve 60 is a solenoid actuated hydraulic valve which controls the upward or downward movement of conveyor system 32 by actuating hydraulic cylinder 38 in an appropriate direction. As soon as the conveyor system has been tilted downward slightly to increase the spacing between the rear end of the conveyor system and the terrain, upper section 54 of tail skid 52 will once again assume a vertical position causing microswitch 56 to close. When this event occurs, both microswitches 56 and 58 will be closed which will place a voltage on both the "up" and "down" inputs of attitude control valve 60. This condition causes hydraulic cylinder 38 to maintain a fixed extension. Thus the ground position sensor or sensing means which includes tail skid 52 and switches 56 and 58 generates an electrical output signal which maintains a fixed spacing between the rear end of the conveyor system and the terrain.

FIGS. 3 and 11 describe an automatic conveyor belt stopping feature. A pressure actuated switch 62 is coupled to the vertical face of a protective housing 64 which is coupled to the front portion of the conveyor system. When a cotton module or other material being loaded by the transporter contacts the spring biased pressure plate of switch 62, the contacts of switch 62 are opened which creates an open circuit in the forward direction operating path of the conveyor direction control valve and causes the conveyor to immediately stop. This automatic stop feature prevents damage to the material being loaded or to the components of the conveyor system.

It will be apparent to those skilled in the art that the disclosed self-loading material transporter may be modified in numerous ways and may assume many embodiments other than the preferred forms specifically set out and described above. For example, it may be desirable to utilize a truck having front and rear wheel drive in which case the ground speed sensor would sense the rotation velocity of the driven front wheels. According, it is intended by the appended claims to cover all such modifications of the invention which fall within a true spirit and scope of the invention.

I claim:

1. A self-loading transporter comprising:
   a. a land vehicle supported by wheels and having a bed including first and second ends and pivot means coupled to said bed in proximity to the second end of said bed, said vehicle further including a plurality of load support wheels coupled to said vehicle in proximity to said pivot means;
   b. a conveyor system coupled to said pivot means and having a substantially linear upper surface and a lower surface, first and second ends, and a continuous flexible conveyor belt extending around the upper and the lower surface and the first and second ends for loading and unloading material from said vehicle, said conveyor system including a plurality of rollers positioned below the section of said conveyor belt passing along the upper surface of said conveyor system for providing low friction support for said conveyor belt, said conveyor system including a first section extending between said pivot means and the first end of said system and a second section extending between said pivot means and the second end of said system;
   c. conveyor drive means for translating said conveyor belt in first or second directions along the upper surface of said conveyor system;
   d. positioning means coupled to said vehicle and to the first section of said conveyor system for tilting said conveyor system between a horizontal position and an inclined position;
   e. first velocity measurement means for determining the rate of translation of said vehicle with respect to the ground;
   f. second velocity measurement means for measuring the rate of movement of said conveyor belt with respect to said conveyor system;
   g. synchronization means coupled to said first and second velocity measurement means for synchronizing the rate of translation of said conveyor belt to the rate of translation of said vehicle whereby said conveyor belt is displaced at a velocity equal to the velocity of displacement of said vehicle with respect to the ground;
   h. sensing means coupled near the second end of said conveyor system for generating an output signal representative of the spacing between the second end of said system and the ground; and
   i. attitude control means coupled to said positioning means and responding to the output signal from said sensing means for actuating said positioning means to maintain a predetermined constant spacing between the second end of said conveyor system and the ground as said conveyor system is translated with respect to the ground;
   whereby the weight of the material being loaded onto or unloaded from said transporter is transferred directly between the ground and said vehicle load support wheels without the assistance of auxiliary support wheels positioned between said load support wheels and the second end of said conveyor system.

2. The self-loading material transporter of claim 1 wherein said first velocity measurement means measures the rate of rotation of a non-driven wheel of said vehicle.

3. The self-loading material transporter of claim 1 wherein said conveyor system includes a first axle positioned near the first end of said conveyor system for rotatably supporting the inner end surface of said conveyor belt and a second axle positioned at the second end of said conveyor system for rotatably supporting the inner end surface of said conveyor belt.

4. The self-loading material transporter of claim 3 wherein said first translating means includes drive means coupled to said conveyor system for rotating said first axle.

5. The self-loading material transporter of claim 3 further including length adjustment means coupled between said first and second axles for adjusting the tension exerted on said conveyor belt by said first and second axles.

6. The self-loading material transporter of claim 1 wherein the width of said conveyor belt spans substantially the entire width of said conveyor system.

7. The self-loading material transporter of claim 1 wherein said sensing means further includes a tail skid pivotally coupled at one end near the second end of the conveyor system and having a second end which engages the upper surface of the ground.

8. The self-loading material transporter of claim 1 wherein said conveyor belt is fabricated from a rubberized fabric material.

9. The self-loading material transporter of claim 1 wherein said first and second velocity measurement means comprise electromagnetic velocity sensors which generate an electrical output signal representative of the velocity being measured.

10. The self-loading material transporter of claim 1 further including an automatic stop switch coupled to said conveyor system for deactivating said first translating means when the material being loaded arrives at a predetermined location near the first end of said conveyor system.

11. The self-loading material transporter of claim 1 further including a minimum speed sensor for preventing actuation of said first translating means unless said conveyor system is being translated with respect to the ground at a minimum velocity.

12. The self-loading material transporter of claim 11 further including an override switch coupled to said first translating means for deactivating said minimum speed sensor.

* * * * *